(12) United States Patent
Zhang et al.

(10) Patent No.: US 11,286,122 B2
(45) Date of Patent: Mar. 29, 2022

(54) AUTOMATIC TRANSFER SYSTEM AND METHOD FOR ITEMS

(71) Applicant: Beijing Geekplus Technology Co., Ltd., Beijing (CN)

(72) Inventors: Hanbin Zhang, Beijing (CN); Mengdi Wang, Beijing (CN)

(73) Assignee: Beijing Geekplus Technology Co., Ltd., Beijing (CN)

( * ) Notice: Subject to any disclaimer, the term of this patent is extended or adjusted under 35 U.S.C. 154(b) by 291 days.

(21) Appl. No.: 16/464,215

(22) PCT Filed: Jul. 25, 2018

(86) PCT No.: PCT/CN2018/097059
§ 371 (c)(1),
(2) Date: May 24, 2019

(87) PCT Pub. No.: WO2019/062310
PCT Pub. Date: Apr. 4, 2019

(65) Prior Publication Data
US 2019/0389672 A1    Dec. 26, 2019

(30) Foreign Application Priority Data

Sep. 30, 2017   (CN) .......................... 201710928844.6
Apr. 27, 2018   (CN) .......................... 201810394665.3

(51) Int. Cl.
*G06F 7/00* (2006.01)
*B65G 47/90* (2006.01)

(52) U.S. Cl.
CPC ...... *B65G 47/905* (2013.01); *B65G 2203/044* (2013.01)

(58) Field of Classification Search
CPC ............ B65G 47/905; B65G 2203/044; B65G 2201/025; B65G 11/023; B65G 1/0492; B07C 3/00; B07C 3/02
USPC .......................... 700/213–214, 223, 228–230
See application file for complete search history.

(56) References Cited

U.S. PATENT DOCUMENTS

2016/0335594 A1 * 11/2016 Czachor, Jr .............. G01V 8/10
2017/0174432 A1    6/2017 Zhu et al.

FOREIGN PATENT DOCUMENTS

| CN | 105057219 |   | 11/2015 |           |
|----|-----------|---|---------|-----------|
| CN | 105057219 A | * | 11/2015 | ............. B07C 3/008 |
| CN | 204817212 |   | 12/2015 |           |
| CN | 204817213 |   | 12/2015 |           |
| CN | 107626600 |   | 1/2018  |           |
| CN | 207401775 |   | 5/2018  |           |
| CN | 207547050 |   | 6/2018  |           |
| CN | 207576955 |   | 7/2018  |           |
| JP |   101216  |   | 1/1998  |           |

(Continued)

*Primary Examiner* — Yolanda R Cumbess
(74) *Attorney, Agent, or Firm* — Stoel Rives LLP

(57) ABSTRACT

Provided are an automatic transfer system and method for items. The automatic transfer system for items includes: an item container, which is configured to receive to-be-conveyed items with a preset direction; a detection device, which is configured to detect whether items falling into the item container meet a transfer condition; and a carrying device, which is configured to automatically transfer the item container to a preset destination when the items falling into the item container meet the transfer condition.

18 Claims, 7 Drawing Sheets

(56) References Cited

FOREIGN PATENT DOCUMENTS

| | | |
|---|---|---|
| JP | 2003104519 | 4/2003 |
| JP | 2009501685 | 1/2009 |
| JP | 2011157137 | 8/2011 |
| JP | 2015030617 | 2/2015 |
| JP | 2016020276 | 2/2016 |

* cited by examiner

AUTOMATIC TRANSFER SYSTEM AND METHOD FOR ITEMS

CROSS REFERENCE TO RELATED APPLICATIONS

This is a National Stage Application, filed under 35 U.S.C. 371, of International Patent Application No. PCT/CN2018/097059, filed on Jul. 25, 2018, which claims priorities to Chinese patent application No. 201710928844.6, filed on Sep. 30, 2017 and Chinese patent application No. 201810394665.3, filed on Apr. 27, 2018, contents of which are incorporated herein by reference in their entireties.

TECHNICAL FIELD

The present disclosure relates to the field of intelligent logistics and automatic warehouse logistics technologies and, in particular, to an automatic transfer system and method for items.

BACKGROUND

The rapid development of e-commerce has not only brought unprecedented development opportunities to the express delivery industry but also presented severe challenges to express delivery services. How to flexibly and accurately pick parcels with high efficiency and low costs has always been a difficult problem for the industry. The traditional manual matrix sorting is inefficient with high error rate and heavy labor intensity, the employee recruitment is difficult, and the management is difficult. In recent years, the vigorous development of robotic technology has brought huge technological changes to the entire logistics industry and brought new technologies and new design concepts to the sorting industry. In an express robot sorting system, the operator places a parcel on a robot carrying device at a feeder, the robot carries the parcel to a location of a sorting grid mouth and delivers the parcel to the sorting grid mouth to complete a parcel sorting task. The above-mentioned parcel sorting robot system greatly improves the sorting efficiency compared with the traditional manual sorting manner and has the advantages of low cost and high flexibility compared with a traditional automatic manner such as a cross-belt sorter. Thus, the system has been widely concerned and rapidly popularized in the industry.

At present, the general package collection is mainly as follows. A parcel is sorted to a grid mouth in the corresponding direction by a parcel sorting system, and a goods-put person put the parcel from the grid mouth to an item container (goods collection cage trolley or package collection bag, etc.), in which the goods-put person needs to judge whether the item container is fully loaded. Then a transporter carries the item container to a corresponding goods collection temporary storage area for waiting to delivery. At the same time, an empty item container needs to be supplied to the current grid mouth in the exact direction. The speed of carrying and supplying will directly affect the unloading from the sorting system to the grid mouth in the exact direction, thereby affecting the efficiency of the parcel sorting system. In the process, the following scenarios require human to participate: requiring to collect parcels, requiring to determine whether the item container is fully loaded (especially when the goods-put person is in charge of multiple item containers, it is difficult to notify the transporter in time to carry the containers and supply empty item containers according to the load situation of the item containers), and requiring to carry full-loaded containers meanwhile supply empty item containers. On the one hand, the whole process requires a large amount of personnel input to improve the efficiency of collecting and carrying goods. On the other hand, the goods-put person cannot feedback the information of item containers to the transport person in time, which causes lagging for carrying and supplying the item containers, thereby affecting the efficiency of the front-end parcel sorting system. Because of this, whether it is to save labor costs, improve carrying efficiency, or to carry and supply the goods collection container in time to ensure the efficiency of front-end parcel sorting, it is urgent to require a system that can achieve the automatic carrying of the goods collection container to improve efficiency and reduce labor costs.

Therefore, a new automatic transfer system for items is urgently needed.

With the rapid development of e-commerce in recent years, logistics distribution has gradually become a core element of e-commerce. In the current e-commerce, since logistics distribution has the following characteristics: miniaturization of the shipment unit, variety, small batch, multiple lots and short period, it is difficult for warehouse logistics methods with the traditional manual operation, the conveyor belt or automatic guided vehicle (AGV) to meet the development needs of e-commerce, and the automated warehouse logistics based on the intelligent robot is emerging.

The intelligent robots can achieve functions such as carrying, sorting, picking and the like in the automatic warehouse logistics. The parcel sorting system taking the intelligent robot as a subject of parcel sorting can greatly reduce the comprehensive cost of parcel sorting. The parcel sorting system is a logistics sorting system which emerges at the right moment on the basis of China's national conditions and geographical factors and with comprehensively consideration of the balance between the labor cost of labor-intensive industries in China and the cost of precise complex automation equipment. The traditional parcel sorting system is based on a steel platform structure and takes the steel platform structure as a parcel sorting platform. The steel platform is provided with multiple sorting grid mouths, and a chute and an item container are disposed under each sorting grid mouth. The intelligent robot runs along a calculated path on the steel platform and places parcels into the designated sorting grid mouth. FIG. 4 is a schematic diagram of a constitution of a common parcel sorting platform. The steel platform is located in a sorting warehouse. A parcel is transported to the steel platform through a conveyor line, and the parcel is manually taken down from the conveyor line and placed on an intelligent robot on the steel platform. The intelligent robot runs on the steel platform and put the parcel into the designated sorting grid mouth. The parcel through the chute falls into an item container below the chute under the force of gravity. After that, the item container is transported by a carrying robot or manually to a delivery area for subsequent parcel sorting and loading, etc. The parcel sorting system utilizes characters of instant response of the intelligent robot and the flexibility of the distributed system to significantly reduce the comprehensive cost of parcel sorting. FIG. 5 is a schematic diagram of a conventional layout of a sorting grid mouth, a chute and an item container below a steel platform, where filling portions indicate the sorting grid mouths, the thick solid line indicates the chute, and the dashed line indicates the item container. It can be seen that the sorting grid mouths, the chutes and the item containers in the traditional sense are distributed side by side and evenly, and the spacing between adjacent sorting grid mouths is for the robot to pass through.

However, the steel platform sorting system with the traditional layout is inefficient in carrying. Thus, a new layout of the sorting grid mouths, the chutes and the item containers are urgently needed. Under a condition of not wasting input costs, the new layout may leave more walking space for the personnel or carrying robots for carrying item containers so as to improve carrying efficiency.

SUMMARY

In view of this, embodiments of the present disclosure provide an automatic transfer system and method for items.

The embodiments of the present disclosure provide an automatic transfer system for items. The automatic transfer system for items includes: an item container, a detection device and a carrying device. The item container is configured to receive to-be-conveyed items with a preset destination. The detection device is configured to detect whether the items in the item container meet a transfer condition. The carrying device is configured to automatically transfer the item container to a preset location when the items falling into the item container meet the transfer condition. The detection device includes at least one of the following: a distance sensor, which is configured to detect depth information of the items falling into the item container, where the depth information is configured to determine whether the items falling into the item container meet the transfer condition; a counter, which is configured to calculate a number of the items falling into the item container, where the number of the items is configured to determine whether the items falling into the item container meet the transfer condition; an image pickup device, which is configured to acquire an image of a remaining capacity of the item container containing the items falling into the item container, where the image of a remaining capacity of the item container containing the items is configured to determine whether the items falling into the item container meet the transfer condition; or a weight sensor, which is configured to acquire a weight of the items falling into the item container, where the weight of the items is configured to determine whether the items falling into the item container meet the transfer condition.

The embodiments of the present disclosure provide an automatic transfer method for items. The automatic transfer method for items includes: receiving to-be-conveyed items with a preset destination by using an item container; detecting whether the items falling into the item container meet a transfer condition by using a detection device; and automatically transferring the item container to a preset location by using a carrying device when the items falling into the item container meet the transfer condition. The detecting whether the items falling into the item container meet a transfer condition by using a detection device includes at least one of the following: detecting depth information of the items falling into the item container, and determining whether the items falling into the item container meet the transfer condition according to the depth information; calculating a number of the items falling into the item container, and determining whether the number of the items falling into the item container meet the transfer condition according to the number of the items; acquiring and image of a remaining capacity of the item container, the item falling into the item container through an image pickup device, and determining whether the items falling into the item container meet the transfer condition according to the image of a remaining capacity of the item container containing the items; or acquiring a weight of the items falling into the item container through a weight sensor, and determining whether the items falling into the item container meet the transfer condition according to the weight of the items.

An embodiment of the present disclosure provides a computer-readable storage medium storing programs for an automatic transfer method for items that implement the above-mentioned automatic transfer method for items when executed by a processor.

Other aspects can be understood after the accompanying drawings and detailed description are read and understood.

DETAILED DESCRIPTION

Figure 1:
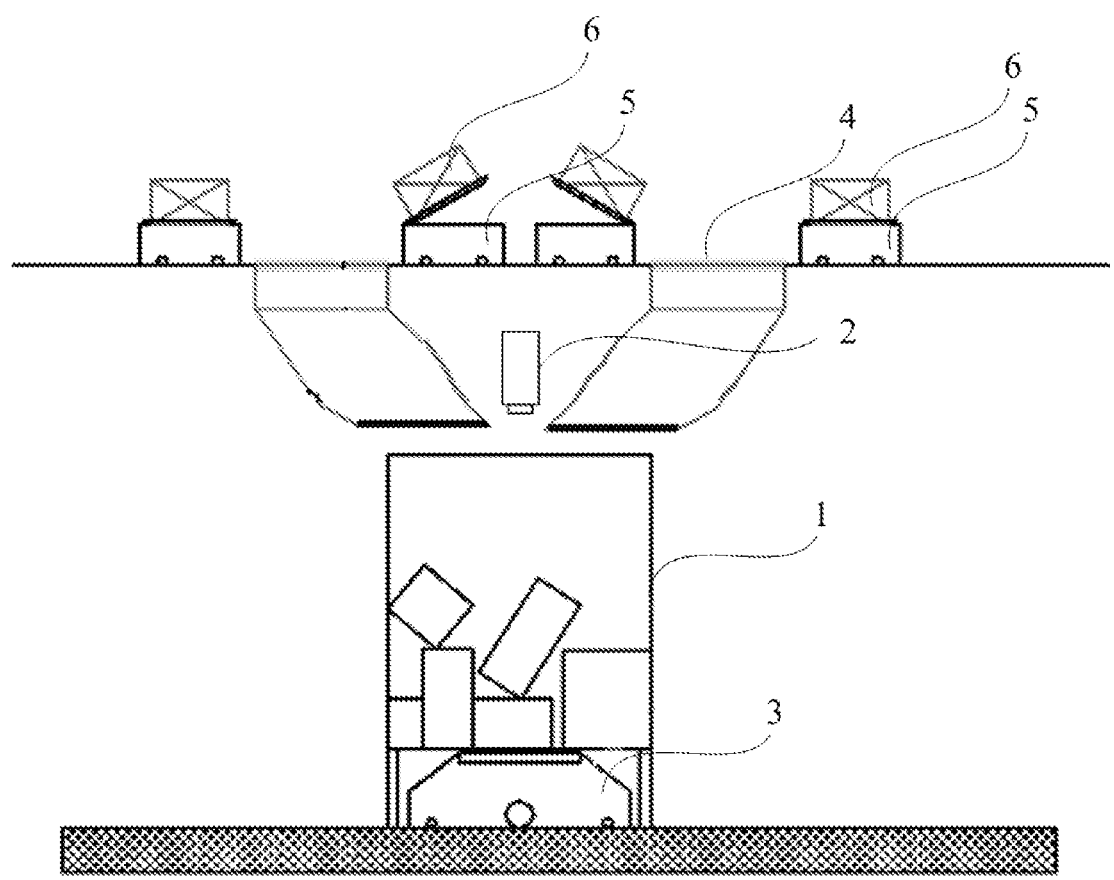
FIG. 1 is a structural diagram of an automatic transfer system for items provided by an embodiment of the present disclosure.

Embodiments of the present disclosure will be described in detail below with reference to the accompanying drawings.

Apparently, the described embodiments are merely a part, not all, of embodiments of the present disclosure. Based on the embodiments described herein, all other embodiments obtained by those skilled in the art without creative work are within the scope of the present disclosure.

The embodiments of the present disclosure provide an automatic transfer system for items. The automatic transfer system for items includes: an item container, a detection device and a carrying device. The item container is configured to receive to-be-conveyed items with a preset destination. The detection device is configured to detect whether the items in the item container meet a transfer condition. The carrying device is configured to automatically transfer the item container to a preset location when the items falling into the item container meet the transfer condition. The detection device includes at least one of the following: a distance sensor, which is configured to detect depth information of the items falling into the item container, where the depth information is configured to determine whether the items falling into the item container meet the transfer condition; a counter, which is configured to calculate a number of the items falling into the item container, where the number of the items is configured to determine whether the items falling into the item container meet the transfer condition; an image pickup device, which is configured to acquire an image of a remaining capacity of the item container containing the items falling into the item container, where the image of a remaining capacity of the item container containing the items is configured to determine whether the items falling into the item container meet the transfer condition; or a weight sensor, which is configured to acquire a weight of the items falling into the item container, where the weight of the items is configured to determine whether the items falling into the item container meet the transfer condition.

According to an implementation of the embodiments of the present disclosure, the system further includes a sorting grid mouth, and the sorting grid mouth is bound to the direction of the items.

According to an implementation of the embodiments of the present disclosure, the sorting grid mouth is configured to assign the items to different item containers according to directions of the items.

According to an implementation of the embodiments of the present disclosure, when the item container corresponding to the sorting grid mouth is removed, the sorting grid mouth is turned into a self-locking state.

According to an implementation of the embodiments of the present disclosure, the system further includes a scheduling server, and the scheduling server is configured to be in communication connection with the detection device and the carrying device respectively.

According to an implementation of the embodiments of the present disclosure, the detection device is configured to send transfer indication information to the scheduling server when the items in the item container meet the transfer condition, and the scheduling server is configured to control the carrying device to transfer the item container to the preset location according to the indication information.

According to an implementation of the embodiments of the present disclosure, the scheduling server is configured to acquire electric quantity information of the carrying device, and control the carrying device to get charged in a first preset area when the remaining electric quantity of the carrying device meets a preset condition.

According to an implementation of the embodiments of the present disclosure, the carrying device is further configured to carry an empty item container from a second preset area to a preset sorting grid mouth.

According to an implementation of the embodiments of the present disclosure, the carrying device is configured to be navigated by identifying a graphic combination.

The embodiments of the present disclosure provide an automatic transfer method for items. The automatic transfer method for items includes: receiving to-be-conveyed items with a preset destination by using an item container; detecting whether the items falling into the item container meet a transfer condition by using a detection device; and automatically transferring the item container to a preset location by using a carrying device when the items falling into the item container meet the transfer condition. The detecting whether the items falling into the item container meet a transfer condition by using a detection device includes at least one of the following: detecting depth information of the items falling into the item container, and determining whether the items falling into the item container meet the transfer condition according to the depth information; calculating a number of the items falling into the item container, and determining whether the number of the items falling into the item container meet the transfer condition according to the number of the items; acquiring an image of a remaining capacity of the item container containing the items falling into the item container through an image pickup device, and determining whether the items falling into the item container meet the transfer condition according to the image of a remaining capacity of the item container containing the items; or acquiring a weight of the items falling into the item container through a weight sensor, and determining whether the items falling into the item container meet the transfer condition according to the weight of the items.

According to an implementation of the embodiments of the present disclosure, the method further includes: configuring a sorting grid mouth, and binding the sorting grid mouth to the direction of the items.

According to an implementation of the embodiments of the present disclosure, the items are assigned to different item containers by using the sorting grid mouths according to the directions of the items.

According to an implementation of the embodiments of the present disclosure, when the item container corresponding to the sorting grid mouth is removed, the sorting grid mouth is turned into a self-locking state.

According to an implementation of the embodiments of the present disclosure, the method further includes: configuring a scheduling server, which is configured to be in communication connection with the detection device and the carrying device respectively.

According to an implementation of the embodiments of the present disclosure, the detection device sends transfer indication information to the scheduling server when the items in the item container meet the transfer condition, and the scheduling server controls the carrying device to transfer the item container to the preset location according to the indication information.

According to an implementation of the embodiments of the present disclosure, the scheduling server acquires electric quantity information of the carrying device, and the scheduling server controls the carrying device to get charged in a first preset area when the remaining electric quantity of the carrying device meets a preset condition.

According to an implementation of the embodiments of the present disclosure, the carrying device carries an empty item container from a second preset area to a preset sorting grid mouth.

According to an implementation of the embodiments of the present disclosure, the carrying device is navigated by identifying a graphic combination.

The carrying efficiency of a steel platform sorting system with the traditional layout is low, reasons are in that:

1. After the sorting is completed, the item container containing parcels needs to be transported to a delivery area by a carrying robot or a person. At this point, the carrying robot or the person needs to move and operate on the ground under the steel platform. Since the chutes and the item containers are evenly distributed, only positions under the long chutes in the field (e.g., lateral positions under the three rows of long chutes in FIG. 5, but the height is limited) may be used as passages for the carrying robot or the person to move and carry, and the carrying speed is limited. There is no longitudinal carrying passage in the entire space, so the flexible walking of the carrying robot or the person cannot be achieved and the demand for efficient transportation cannot be met. If longitudinal passages are increased, several columns of chutes and corresponding item containers need to be reduced, which reduces the number of sorted parcels in the same time and reduces the efficiency of sorting and carrying.

2. In the entire steel platform structure, support columns are disposed under the steel platform and the support columns need to be placed in the carrying passages. In the carrying operation, the carrying robot regards the passages including the support columns as obstacles that cannot be passed through, which reduces the carrying efficiency. If the number of chutes and item containers is reduced but new passages are increased, the efficiency of sorting and carrying will be reduced. If the span of the columns is increased to reduce the number of columns, the height and thickness of girders of the steel platform need to be increased for the sake of safety, which adds extra cost to cause wastes costs.

Figure 5:
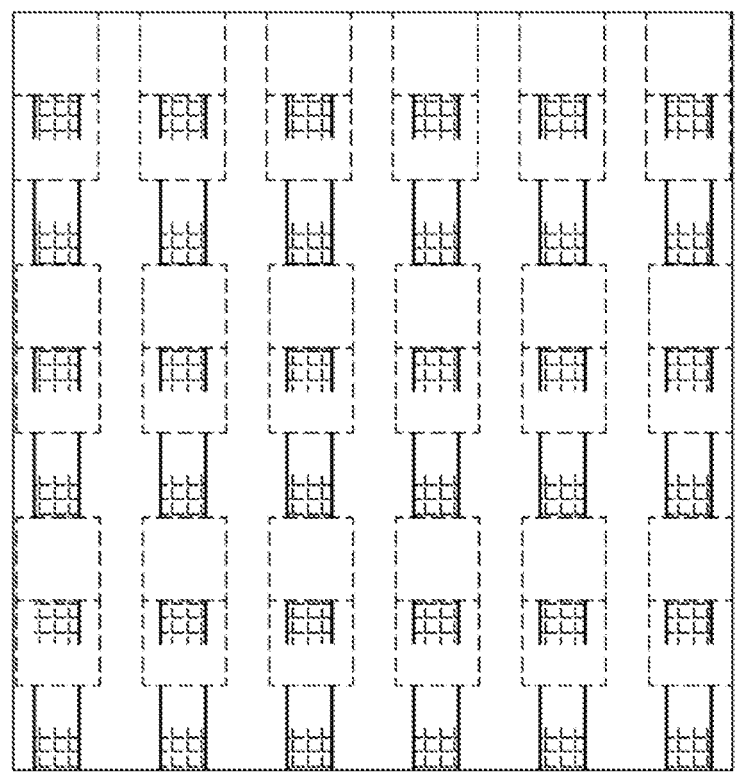
FIG. 5 is a schematic diagram of a conventional layout of a sorting platform in the related art.

3. The item containers under the steel platform are evenly disposed, so that the chutes corresponding to some sorting grid mouths need to be customized variously. As shown in FIG. 5, the length and slope of the adjacent two rows of chutes are different, which cannot be customized uniformly, thereby causing waste of the design, production and construction costs.

In the embodiments of the present disclosure, the layout relationship of the sorting grid mouths, the chutes and the item containers of the sorting platform in the automatic transfer system for items is redesigned, and the demand for place space which the chutes and the item containers require is minimized, so that the space which may be served as the carrying passages in the place is greatly increased.

According to an implementation of the embodiments of the present disclosure, the system further includes a sorting platform, and the sorting platform includes a sorting unit. The sorting unit includes multiple sorting grid mouths disposed on a platform body of the sorting platform, multiple chutes located under the platform body and having the same number as the sorting grid mouths, and multiple item containers located under the platform body and having the same number as the sorting grid mouths. An item container is disposed under each sorting grid mouth, and each sorting grid mouth is docked with an inlet of a chute. Each of the chutes is inclined and configured to interface the sorting grid mouth at the inlet of the chute with the item container under an adjacent sorting grid mouth adjacent to the sorting grid mouth. The adjacent sorting grid mouth and the sorting grid mouth which is docked with the inlet of the chute are adjacent clockwise or adjacent counterclockwise.

According to an implementation of the embodiments of the present disclosure, the sorting unit includes sorting grid mouths with the number being 2 times k, and the sorting grid mouths with the number being 2 times k are distributed in a manner of 2 rows and k columns or k rows and 2 columns, where the k is an integer greater than or equal to 2.

According to an implementation of the embodiments of the present disclosure, the sorting unit includes 4 sorting grid mouths, and the 4 sorting grid mouths are distributed in a manner of 2 rows and 2 columns.

According to an implementation of the embodiments of the present disclosure, a first item container is disposed under a first sorting grid mouth, a second item container is disposed under a second sorting grid mouth of the 4 sorting grid mouths, a third item container is disposed under a third sorting grid mouth of the 4 sorting grid mouths, a fourth item container is disposed under a fourth sorting grid mouth of the 4 sorting grid mouths, an inlet of a first chute is docked with the first sorting grid mouth, an outlet of the first chute is docked with the second item container, an inlet of a second chute is docked with the second sorting grid mouth, an outlet of the second chute is docked with the third item container, an inlet of a third chute is docked with the third sorting grid mouth, an outlet of the third chute is docked with the fourth item container, an inlet of a fourth chute is docked with the fourth sorting grid mouth, and an outlet of the fourth chute is docked with the first item container.

According to an implementation of the embodiments of the present disclosure, the sorting unit includes 6 sorting grid mouths, and the 6 sorting grid mouths are distributed in a manner of 2 rows and 3 columns.

According to an implementation of the embodiments of the present disclosure, the sorting grid mouth is a square sorting grid mouth.

According to an implementation of the embodiments of the present disclosure, a side length of the square sorting grid mouth is 600 mm, and an interval between adjacent sorting grid mouths is 1200 mm.

According to an implementation of the embodiments of the present disclosure, the item container is disposed on a carrier.

According to an implementation of the embodiments of the present disclosure, the sorting platform includes the platform body, a support column for supporting the platform body, and multiple sorting units for sorting.

According to an implementation of the embodiments of the present disclosure, the multiple sorting units are distributed in the sorting platform in an array form, and the sorting platform is set up in a sorting place.

According to an implementation of the embodiments of the present disclosure, the support column is disposed at an interval between the sorting units.

According to an implementation of the embodiments of the present disclosure, the system includes a first robot, and the first robot is configured to move on the platform body and put items to be sorted into any sorting grid mouth on the platform body.

According to an implementation of the embodiments of the present disclosure, the carrying device is a second robot, and the second robot is capable of carrying the item container.

The automatic transfer system for items provided by the embodiments of the present disclosure can detect the depth information of the items falling into the item container through the distance sensor. On the basis of the depth information, the carrying device automatically transfers the item container to the preset location when the items falling into the item container meet the transfer condition. Compared with other methods in the related art, the present application provides a new automatic transfer method for items, which ensures the accuracy of automatic detection results and improves the efficiency of item transfer.

With reference to FIG. 1, FIG. 1 is an automatic transfer system for items according to an embodiment of the present disclosure. The system includes an item container 1, a detection device 2 and a carrying device 3.

The item container 1 may be a common container for containing items to be sorted, such as a common cage trolley, a parcel bag and the like. The item container usually receives items having common sorting attributes (e.g., receiving items sent to Haidian District, Beijing), that is, the item container 1 receives to-be-conveyed items with a preset destination.

In order to enable the item container 1 to receive the to-be-conveyed items with the preset destination, with reference to FIG. 1, the system may further include a sorting grid mouth 4. The sorting grid mouth 4 is bound to the item container 1 for receiving the preset destination so as to receive the items with the preset destination.

In order to determine whether the item container is fully loaded with the items or reaches a preset capacity, the system further includes the detection device 2 which includes a distance sensor. The distance sensor can detect depth information of the items falling into the item container 1, and the depth information is for determining whether the items falling into the item container 1 meet a transfer condition.

For example, the sensor can be an ultrasonic, laser, or infrared sensor with a distance measurement function. When measuring the distance, the detection device 2 may determine whether the items in the item container 1 meet a fixed depth by integrally scanning a plane of the item container 1 to determine whether the item container is full.

Figure 2:
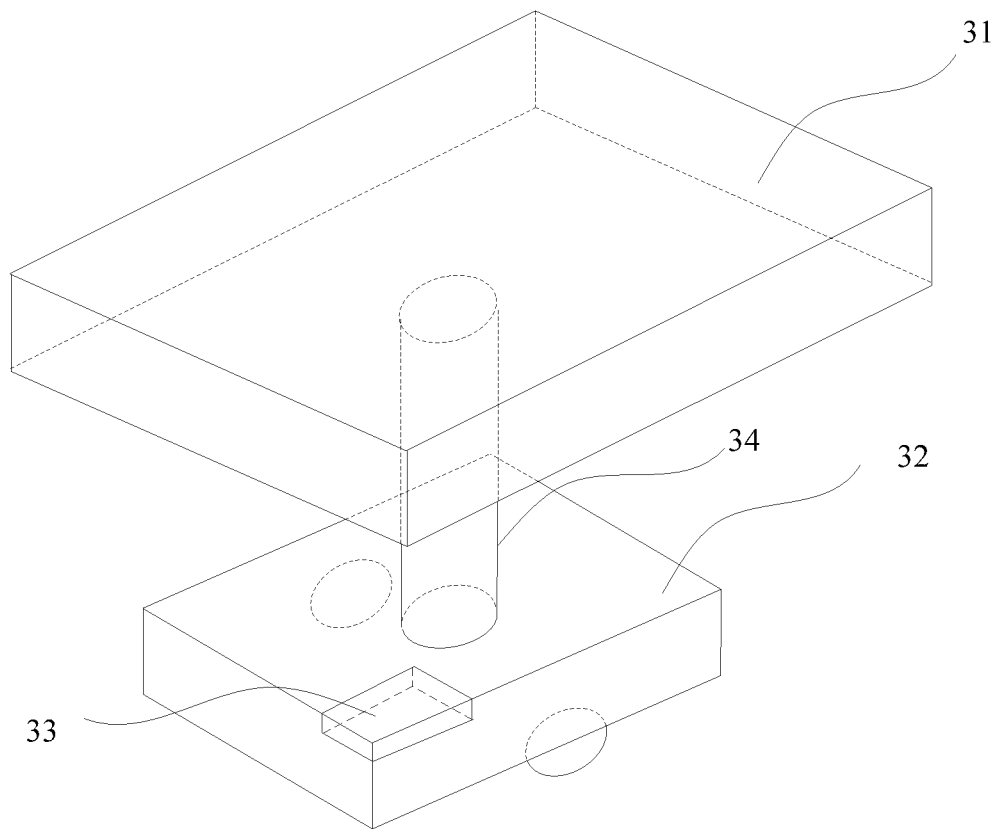
FIG. 2 is a structural diagram of a carrying device for conveying items provided by an embodiment of the present disclosure.

The carrying device 3 automatically transfers the item container 1 to a preset location when the items falling into the item container 1 meet the transfer condition. For example, with reference to FIG. 2, the carrying device 3 includes a bearing device 31, a walking device 32, a height adjusting device 34, and a communication device 33.

The bearing device 31 can bear a bottom of the item container 1, and of course, can also be used for bearing other parts of the item container 1 so as to support the item container 1. The communication device 33 can acquire information about whether the items meet the transfer condition. When acquiring that the item container 1 is fully loaded already and can be automatically transported away, the communication device 33 informs the height adjusting device 34 to adjust the height to support the item container 1, and the item container 1 is automatically transported away by the walking device 32.

According to an implementation of the embodiments of the present disclosure, the system further includes: a sorting grid mouth, which is bound to the destination of the item. The sorting grid mouths assign the items to different item containers 1 according to the directions of the items.

In order to ensure that no item drops off from the sorting grid mouth after the item container 1 is removed, according to an implementation of the embodiments of the present disclosure, when the item container 1 corresponding to the sorting grid mouth is removed, the sorting grid mouth is turned into a self-locking state.

According to an implementation of the embodiments of the present disclosure, the detection device 2 includes a counter. The counter determines that the carrying device 3 meets the transfer condition by calculating the number of the items falling into the item container 1.

According to an implementation of the embodiments of the present disclosure, the detection device 2 includes an image pickup device. The image pickup device can acquire an image of a remaining capacity of the item container containing the items in the item container 1 and then determines that the carrying device 3 meets the transfer condition.

According to an implementation of the embodiments of the present disclosure, the detection device 2 includes a weight sensor. The weight sensor can acquire a weight of the items in the item container 1 and then determines that the carrying device 3 meets the transfer condition.

According to an implementation of the embodiments of the present disclosure, the system further includes: a scheduling server. The scheduling server is in communication connection with the detection device 2 and the carrying device 3 respectively.

According to an implementation of the embodiments of the present disclosure, the detection device 2 sends transfer indication information to the scheduling server when the items in the item container 1 meet the transfer condition, and the scheduling server controls the carrying device 3 to transfer the item container 1 to the preset location according to the indication information.

According to an implementation of the embodiments of the present disclosure, the scheduling server can acquire electric quantity information of the carrying device 3. The scheduling server controls the carrying device 3 to get charged in a first preset area when the remaining electric quantity of the carrying device 3 meets a preset condition. In order to facilitate the operation of the carrying device, the carrying device is provided with a battery inside, so that the carrying device can carry out the transportation task by its own energy. The carrying device monitors remaining electric quantity of the battery in real time, and when the remaining electric quantity of the carrying device reaches a threshold, the carrying device is controlled to be charged in a preset area. In addition, the carrying device can acquire the electric quantity information of the carrying device. When the remaining electric quantity of the carrying device meets the preset condition, the carrying device reports remaining electric quantity information to the scheduling server, and the scheduling server comprehensively considers whether to control the carrying device to the preset area to get charged according to multiple factors such as current electric quantity and a scheduling task.

According to an implementation of the embodiments of the present disclosure, the carrying device 3 also carries an empty item container 1 from a second preset area to a preset sorting grid mouth. In this way, after the item container full of the items is transported away, the carrying device 3 can carry a new item container.

According to an implementation of the embodiments of the present disclosure, the carrying device 3 is navigated by identifying a graphic combination. The graphic combination can be a two-dimensional code or any graphic combination composed of other graphics. The carrying device for items determines current geographical location information by identifying the graphic combination.

Figure 3:
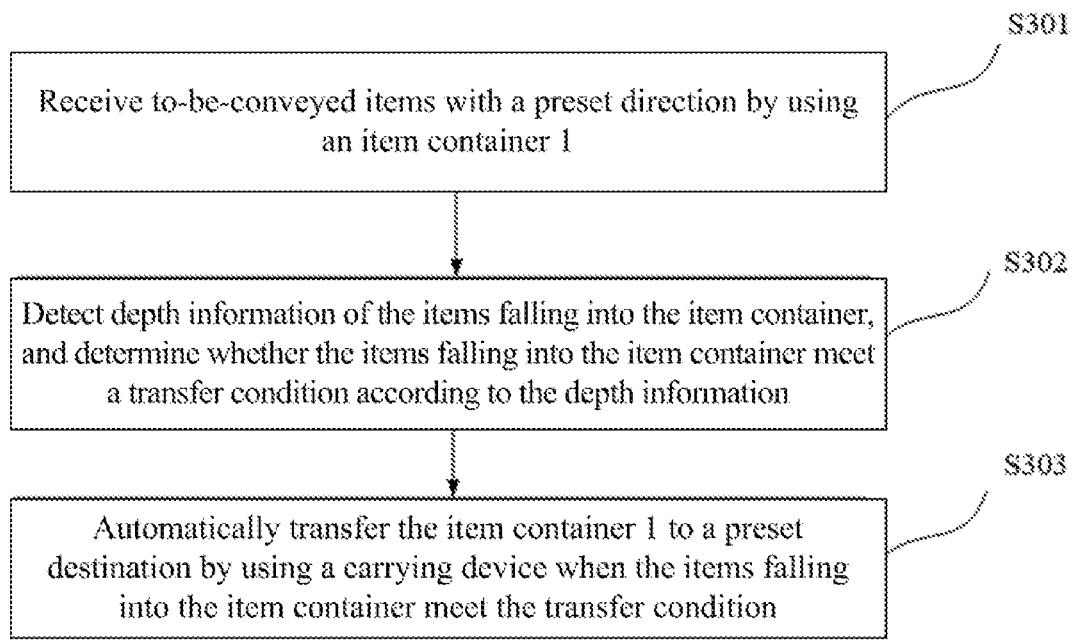
FIG. 3 is a flow chart of an automatic transfer method for items provided by an embodiment of the present disclosure.
Figure 4:
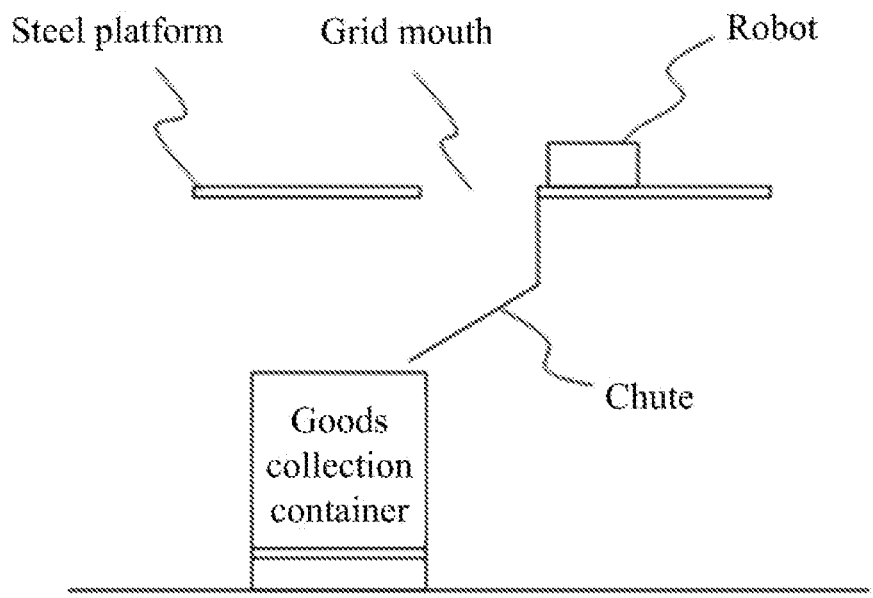
FIG. 4 is a schematic diagram of a constitution of a typical parcel sorting platform.

With reference to FIG. 3, an embodiment of the present disclosure further provides an automatic transfer method for items, including the following steps.

In S301, to-be-conveyed items with a preset destination are received by using an item container.

The item container 1 may be a common container for containing items to be sorted, such as a common cage trolley, a parcel bag and the like. The item container usually receives items having common sorting attributes (e.g., receiving items sent to Haidian District, Beijing), that is, the item container 1 receives to-be-conveyed items with the preset destination.

In order to enable the item container 1 to receive the to-be-conveyed items with the preset destination, with reference to FIG. 1, the system may further include a sorting grid mouth 4. The sorting grid mouth 4 is bound to the item container 1 for receiving the preset destination so as to receive the items with the preset destination.

In S302, depth information of the items falling into the item container is detected, and whether the items falling into the item container meet a transfer condition is determined according to the depth information.

In order to determine whether the item container is fully loaded with the items or reaches a preset capacity, the system further includes a detection device 2 which includes a distance sensor. The distance sensor can detect the depth information of the items falling into the item container 1, and the depth information is used for determining whether the items falling into the item container 1 meet the transfer condition.

For example, the distance sensor may be an ultrasonic, laser, or infrared sensor with a distance measurement function. When measuring the distance, the detection device 2 may determine whether the items in the item container 1 meet a fixed depth by integrally scanning a plane of the item container 1 so as to determine whether the item container is full.

In S303, the item container is automatically transferred to a preset location by using a carrying device when the items falling into the item container meet the transfer condition.

The carrying device 3 automatically transfers the item container 1 to the preset location when the items falling into the item container 1 meet the transfer condition. For example, with reference to FIG. 2, the carrying device 3 includes a bearing device 31, a walking device 32, a height adjusting device 34, and a communication device 33.

The bearing device 31 can bear a bottom of the item container 1, and of course, can also be used for bearing other parts of the item container 1 so as to support the item container 1. The communication device 33 can acquire information about whether the items meet the transfer condition. When acquiring that the item container 1 is fully loaded already and can be automatically transported away, the communication device 33 informs the height adjusting device 34 to adjust the height to support the item container 1, and the item container 1 is automatically transported away by the walking device 32.

According to an implementation of the embodiments of the present disclosure, the method further includes: configuring a sorting grid mouth, and binding the sorting grid mouth to a direction of the item(s).

According to an implementation of the embodiments of the present disclosure, the items are assigned to different item containers 1 according to the directions of the items.

According to an implementation of the embodiments of the present disclosure, when the item container 1 corresponding to the sorting grid mouth is removed, the sorting grid mouth is turned into a self-locking state.

According to an implementation of the embodiments of the present disclosure, the detecting and determining whether the items falling into the item container 1 meet the transfer condition includes: determining that the carrying device 3 meets the transfer condition by calculating the number of the items falling into the item container 1.

According to an implementation of the embodiments of the present disclosure, the detecting and determining whether the items falling into the item container 1 meet the transfer condition includes: acquiring an image of a remaining capacity of the item container containing the items in the item container 1 through an image pickup device so as to determine that the carrying device 3 meets the transfer condition.

According to an implementation of the embodiments of the present disclosure, the detecting and determining whether the items falling into the item container 1 meet the transfer condition includes: acquiring a weight of the items in the item container 1 through a weight sensor so as to determine that the carrying device 3 meets the transfer condition.

According to an implementation of the embodiments of the present disclosure, the method further includes: configuring a scheduling server and enabling the scheduling server to be in communication connection with the detection device 2 and the carrying device 3 respectively.

According to an implementation of the embodiments of the present disclosure, the detection device 2 sends transfer indication information to the scheduling server when the items in the item container 1 meet the transfer condition, and the scheduling server controls the carrying device 3 to transfer the item container 1 to the preset location according to the indication information.

According to an implementation of the embodiments of the present disclosure, the scheduling server can acquire electric quantity information of the carrying device 3, and the scheduling server controls the carrying device 3 to get charged in a first preset area when the remaining electric quantity of the carrying device 3 meets a preset condition.

According to an implementation of the embodiments of the present disclosure, the carrying device 3 carries an empty item container 1 from a second preset area to a preset sorting grid mouth.

According to an implementation of the embodiments of the present disclosure, the carrying device 3 is navigated by identifying a graphic combination.

The content of embodiments of the above-mentioned method corresponds to the content of the embodiments of the system and is not repeated herein.

An embodiment of the present disclosure provides a computer-readable storage medium storing programs of automatic transfer method for items that implement the above-mentioned automatic transfer method for items when executed by a processor.

The present disclosure groups multiple sorting grid mouths deposed on a sorting platform, redesigns multiple chutes corresponding to each group of sorting grid mouths and the arrangement of the multiple chutes and redesigns item containers under the current group of the sorting grid mouths and the placement of the item containers, so that the sorting grid mouths, the chutes and the item containers in the current group can meet the requirements for sorting the current group of parcels without interfering with sorting grid mouths, chutes or item containers in other groups. Therefore, carrying passages can be provided between groups for the personnel or carrying robots to walk, and the heights of the carrying passages are not limited.

A sorting system provided by the present disclosure includes a sorting platform and a robot. The sorting platform can be based on a platform structure and there are multiple sorting grid mouths on the sorting platform. A chute and an item container are disposed under each sorting grid mouth. A detailed description of the present disclosure will be given below.

It should be illustrated that the sorting platform and the sorting system provided by the present disclosure are applied to the sorting of logistics parcels and also applied to other scenarios in which the sorting is needed.

The "sorting grid mouth" described in the present disclosure is consistent with the general understanding in the art. The sorting grid mouth refers to an opening on the platform body (which is usually made of steel, hence also referred to as a steel platform). A robot (e.g., a sorting robot) runs on the platform body and puts a parcel (or other item that needs to be sorted) to the opening. The parcel falls into a chute under the opening and finally into an item container disposed at an outlet of the chute. According to its use characteristics, in different cases, the "sorting grid mouth" is sometimes referred to as "sorting grid mouth well".

In an embodiment of the present disclosure, the sorting platform includes a steel platform and a support column for supporting the steel platform, and the sorting platform is set up in a place such as a sorting warehouse. Multiple sorting grid mouths are opened on the steel platform. These sorting grid mouths are evenly distributed on the steel platform at intervals and distributed in an array form. The space between adjacent sorting grid mouths needs to enable the sorting robot to pass.

The present disclosure groups the multiple sorting grid mouths on the sorting platform. For example, multiple adjacent sorting grid mouths are grouped into a group, so that multiple groups of sorting grid mouths are acquired. Each group of the sorting grid mouths includes sorting grid mouths with the number of 2 times k, where the k is an integer greater than or equal to 2. That is to say, one group of the sorting grid mouths includes at least 4 sorting grid mouths, and can also include 6, 8, 10 or more sorting grid mouths.

In an embodiment, the sorting grid mouths with the number of 2 times k in one group of sorting grid mouths are distributed in a manner of 2 rows and k columns or k rows and 2 columns, and the row spacing is equal to the column spacing. It can be considered that the 2×k sorting grid mouths in the group of sorting grid mouths define a square profile (when k=2) or a rectangular profile (when k>2). This arrangement enables the sizes of the multiple chutes set corresponding to the multiple sorting grid mouths to be consistent with the sizes of the multiple sorting grid mouths.

In an embodiment, the total number of sorting grid mouths on the sorting platform should be an integral multiple of the number of sorting grid mouths in one group of sorting grid mouths, such as 24, 36, 60, 64, 200, 400 and the like. This arrangement facilitates to group the sorting grid mouths and the specific number can be set according to actual application requirements.

For the characters of the size and processing technology, etc., of a single sorting grid mouth, the known size and processing technology can be used to complete it. For example, the size of the sorting grid mouth needs to be designed to allow most parcels to pass, thereby ensuring a smooth sorting process. In an embodiment, the sorting grid mouth is a square whose side length is 400~800 mm. For example, the side length is 500~700 mm, and further is 600 mm. This size may ensure that small parcels can be put into the sorting grid mouth. The spacing between adjacent sorting grid mouths may be 1200 mm, and this spacing may ensure that the sorting robot on the steel platform can pass smoothly. Of course, the spacing between the adjacent sorting grid mouths may be set according to other sizes of the sorting robot.

The item container in the embodiments of the present disclosure is disposed under the steel platform. The item container is used for collecting parcels falling through the sorting grid mouth and the chute, and after the collection is completed, the item container is carried to a subsequent processing place by a person or a carrying robot. The item container can be any container having an opening, for example a box with an opening at the top or a box with an opening at a side. The opening is docked with an outlet of the chute. In an embodiment, the item container is a square box with an opening at the top and the side length of the item container is 800~1600 mm, for example, is 1000~1400 mm and further is 1200 mm.

In an embodiment, the number and the position of the item containers correspond to the sorting grid mouths. For example, the number of the item containers is equal to the number of the sorting grid mouths, an item container is disposed under each sorting grid mouth, and the arrangement of the item containers is consistent with the arrangement of the sorting grid mouths. For example, for 4 adjacent sorting grid mouths distributed in a manner of 2 rows and 2 columns, 4 item containers under the 4 sorting grid mouths are also distributed in a manner of 2 rows and 2 columns, and the 4 item containers are concentrated and closely adjacent to each other.

The item container can be directly disposed on the ground. In an alternative embodiment, the item container may be disposed on a carrier and the carrier may be a rack structure with a certain height. The carrying robot may easily carry the item container (with the carrier) through the carrier, which enables the carrying process to be smoother.

<Chute>

In an embodiment of the present disclosure, a chute is disposed between each sorting grid mouth and each item container and the chute is inclined. An inlet of the chute is docked with the sorting grid mouth and an outlet of the chute is docked with the item container. Each chute is arranged to enable the sorting grid mouth at the inlet of the chute dock with the item container under an adjacent sorting grid mouth, and the adjacent sorting grid mouth and the sorting grid mouth which is docked with the inlet of the chute are adjacent clockwise or counterclockwise.

It should be understood that, in each group of sorting grid mouths, each chute corresponding to each sorting grid mouth needs to be set specifically. The way to set the chutes is as follows. For the square outline (when k=2) or the rectangular outline (when k>2) defined by sorting grid mouths with the number of 2 times k in a group of sorting grid mouths, 4 chutes under 4 sorting grid mouths on the 4 corners of the square or the rectangle are disposed specifically, so that in 4 planes in which the 4 chutes are located, two adjacent planes are perpendicular.

The parallel arrangement of all chutes in the conventional layout is improved. Some chutes (for example, the 4 chutes under 4 sorting grid mouths at the corners) in a group of sorting grid mouths is enabled to be no longer parallel but to be rotated 90° respectively. The 4 chutes rotate 90° so as to form a rotating cycle finally, which may be a clockwise cycle or a counterclockwise cycle. Thus, multiple sorting grid mouths in the group of sorting grid mouths may be regarded to be adjacent clockwise or adjacent counterclockwise. Therefore, the parcel sorting may be completed within the range of the group of sorting grid mouths and the item containers without involving other item containers of other groups of sorting grid mouths.

A carrying passage may be disposed between groups of sorting grid mouths. Compared with the conventional layout of the chutes, the area of the carrying passages is greatly increased in the present disclosure.

Embodiment 1—Sorting Units of a Parcel Sorting Platform

Figure 6:
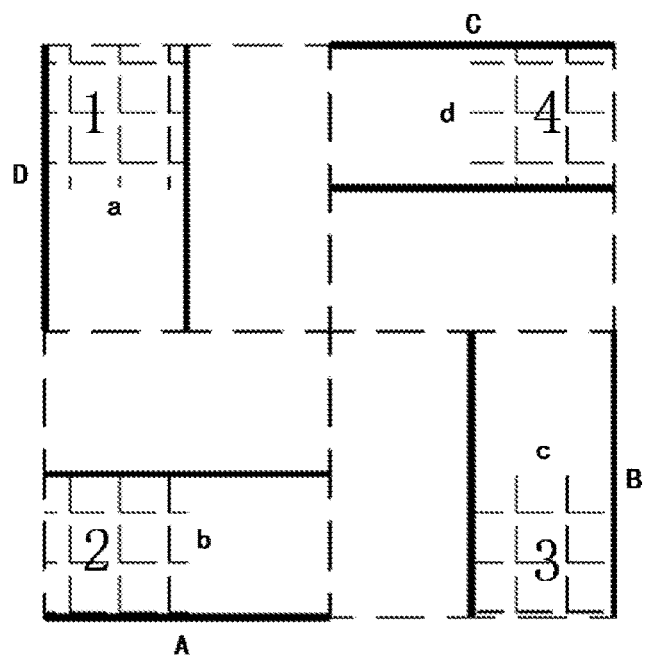
FIG. 6 is a schematic diagram of a layout relationship of sorting grid mouths, chutes and item containers according to an embodiment of the present disclosure, which is a top view.

FIG. 6 is a schematic diagram of a layout relationship of sorting grid mouths, chutes and item containers according to an embodiment of the present disclosure and FIG. 6 is a top view. The part filled with a "#"-shaped grid indicates the sorting grid mouth, the thick solid line indicates the chute, and the dashed line indicates the item container. In the present embodiment, 4 sorting grid mouths are served as a group of sorting grid mouths, and 4 chutes and 4 item containers are disposed under the 4 sorting grid mouths correspondingly.

With reference to FIG. 6, a sorting grid mouth 1, a sorting grid mouth 2, a sorting grid mouth 3 and a sorting grid mouth 4 are a group of sorting grid mouths. The 4 sorting grid mouths are disposed at intervals and in a manner of 2 rows and 2 columns, i.e., 2×2. The row spacing is equal to the column spacing. The 4 sorting grid mouths define a square profile (dashed line area shown in FIG. 6) and the 4 soring grid mouths are disposed on 4 corners of the square.

An item container is disposed under each sorting grid mouth, and there are 4 item containers, i.e., an item container A, an item container B, an item container C and an item container D. The 4 item containers are disposed closely. Under the sorting grid mouth 1 is the item container D, under the sorting grid mouth 2 is the item container A, under the sorting grid mouth 3 is the item container B and under the sorting grid mouth 4 is the item container C.

A chute is disposed between a single sorting grid mouth and a single item container and there are 4 chutes, i.e., a chute a, a chute b, a chute c and a chute d. The sorting grid mouth is connected to the item container through the chute. When an intelligent robot puts a parcel into a certain sorting grid mouth, the parcel falls into the item container through the chute. In the present embodiment, the vertical plane of the chute a is perpendicular to the vertical plane of the chute b, the vertical plane of the chute b is perpendicular to the vertical plane of the chute c, the vertical plane of the chute c is perpendicular to the vertical plane of the chute d, and the vertical plane of the chute d is perpendicular to the vertical plane of the chute a. An outlet of the chute a leads to the item container A, an outlet of the chute b leads to the item container B, an outlet of the chute c leads to the item container C, and an outlet of the chute d leads to the item container D.

That is to say, positions of the 4 chutes and the 4 item containers are relatively concentrated, each sorting grid mouth is docked with the item container under the adjacent sorting grid mouth, and finally the 4 sorting grid mouths, the 4 chutes and the 4 item containers form a rotating cycle, thereby reducing the projection space occupied by the chutes and the item containers under the steel platform.

In the above-mentioned arrangement, the parcel delivered to the sorting grid mouth 1 falls into the item container A through the chute a, the parcel delivered to the sorting grid mouth 2 falls into the item container B through the chute b, and so on, thereby forming a rotating cycle. It should be noted that a direction of the rotating cycle of the 4 chutes in the present embodiment is counterclockwise and the 4 sorting grid mouths are adjacent counterclockwise. In other embodiments, the direction of the rotating cycle of the 4 chutes can be clockwise and the 4 sorting grid mouths are adjacent clockwise.

Embodiment 2—Sorting Units of a Parcel Sorting Platform

Figure 7:
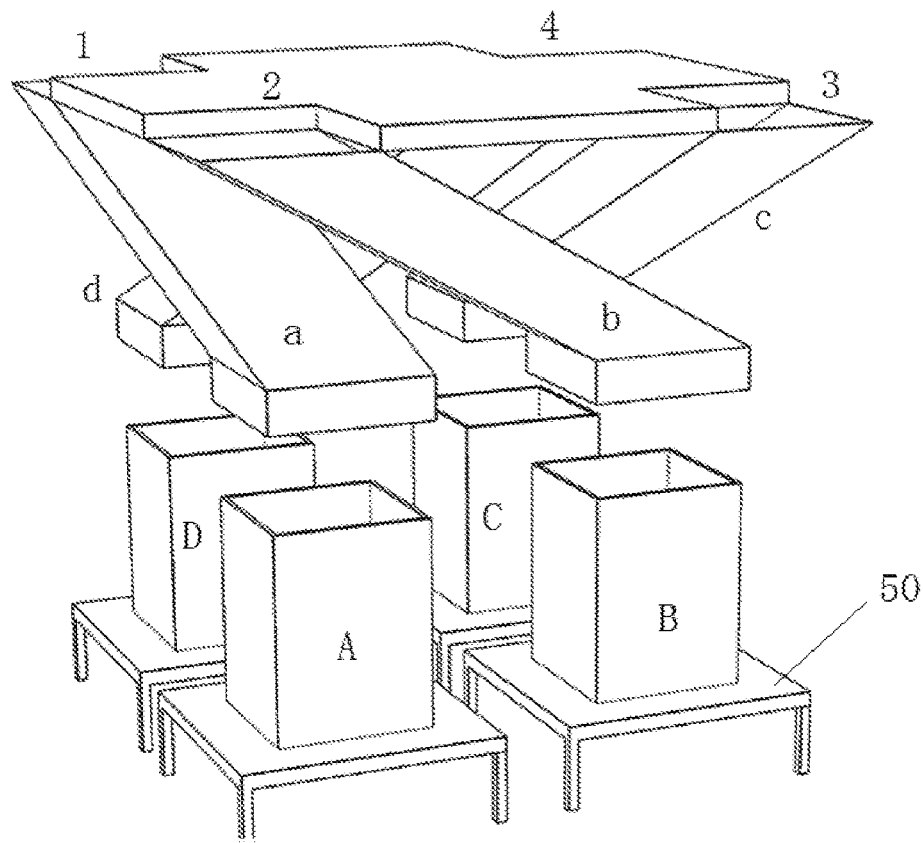
FIG. 7 is a schematic diagram of a layout relationship of sorting grid mouths, chutes and item containers according to another embodiment of the present disclosure, which is a perspective view.

FIG. 7 is a schematic diagram of a layout relationship of sorting grid mouths, chutes and item containers according to an embodiment of the present disclosure and FIG. 7 is a perspective view. In the present embodiment, 4 sorting grid mouths are served as a group of sorting grid mouths, and 4 chutes and 4 item containers are disposed under the 4 sorting grid mouths correspondingly. The 4 sorting grid mouths, the 4 chutes and the 4 item containers form a cycle.

The difference between the present embodiment and the embodiment 1 is that the 4 item containers are disposed loosely rather than disposed closely. The so-called loose arrangement refers to that a certain gap exists between the adjacent item containers in the group. However, the width of the gap is very small with respect to the distance between an item container in the current group and an item container of another group, so that the 4 item containers in the group are still concentrated as a whole.

The difference between the present embodiment and the embodiment 1 also lies in that the 4 item containers in the present embodiment are disposed on carriers 50. The carrier 50 may be a rack structure with a certain height shown in FIG. 7. The carrier 50 in the present embodiment is convenient for the carrying robot to carry the item container on the carrier. The carrier 50 can be carried with the item container together.

The remaining arrangement of the present embodiment is the same as the arrangement of the embodiment 1.

Embodiment 3—A Parcel Sorting Platform

Figure 8:
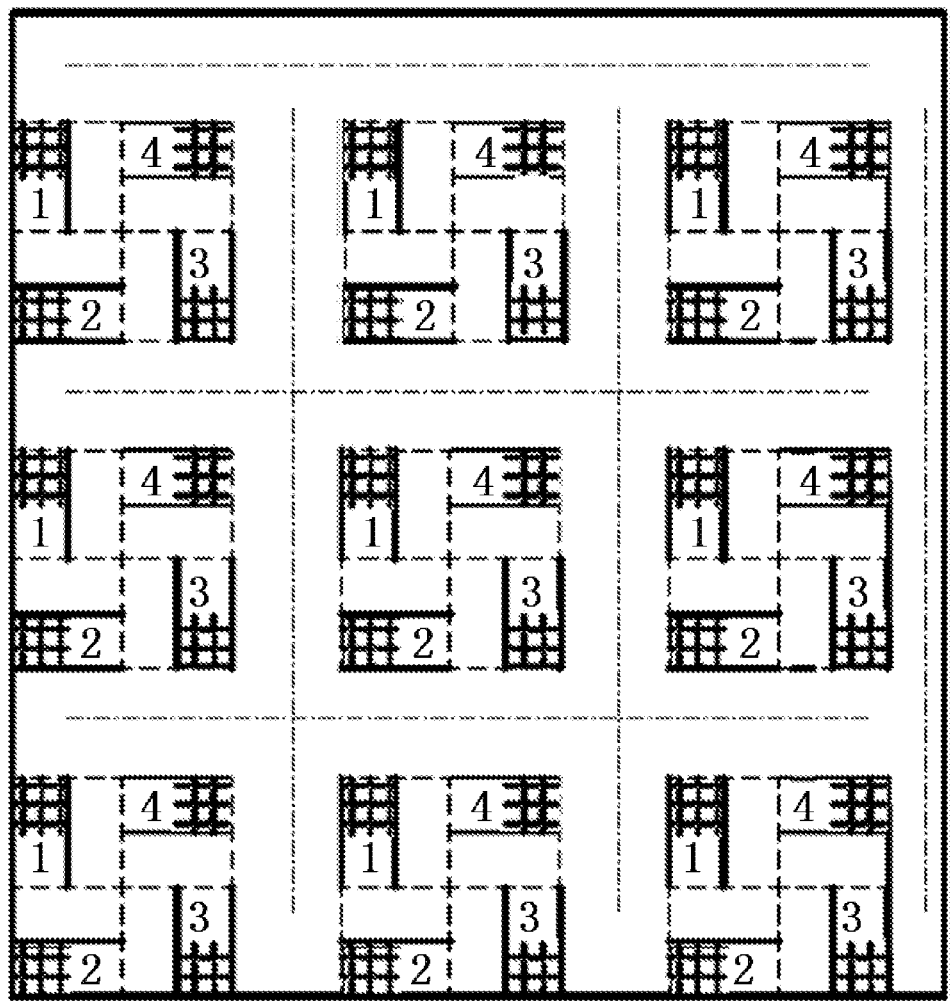
FIG. 8 is a schematic diagram of a sorting platform according to an embodiment of the present disclosure.
Figure 9:
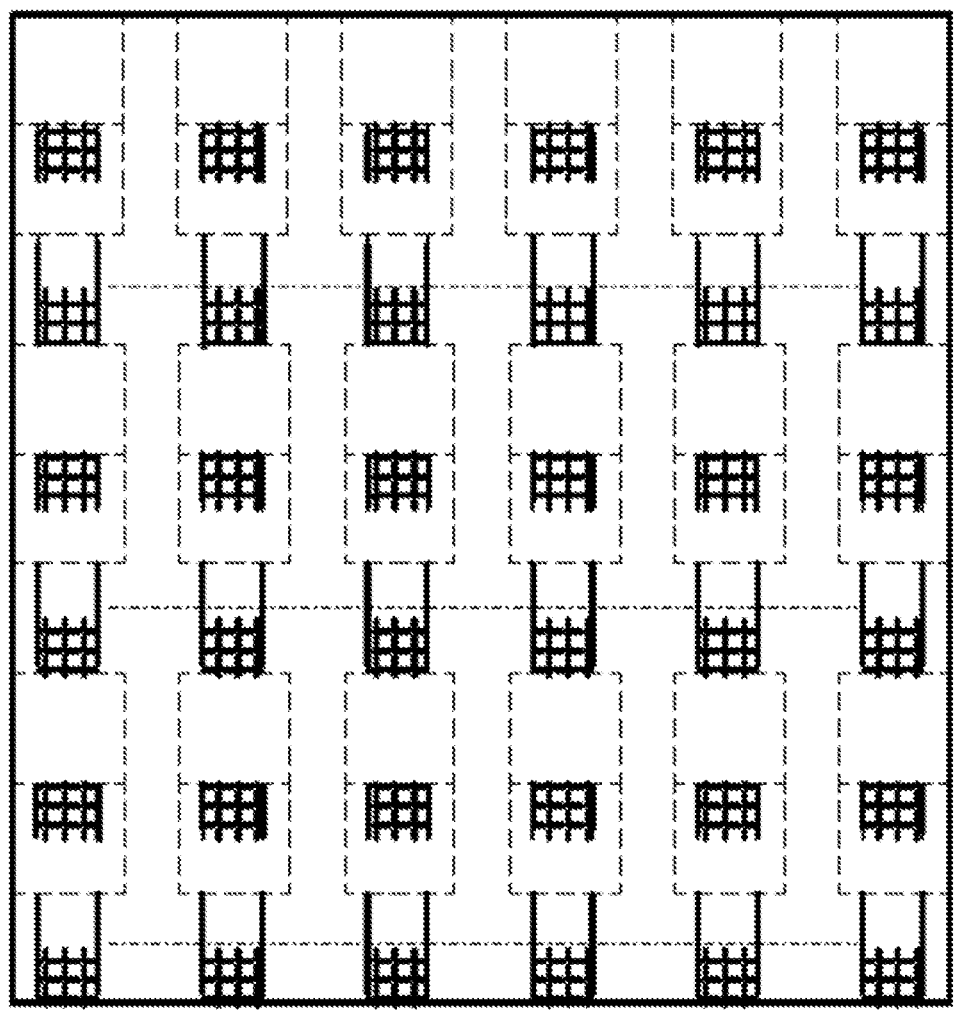
FIG. 9 is a schematic diagram of a sorting platform based on a conventional layout.

FIG. 8 is a structural diagram of a sorting platform according to an embodiment of the present disclosure. FIG. 9 is a schematic diagram of a parcel sorting platform in a conventional layout. FIG. 8 and FIG. 9 are top views. The parcel sorting platform may include a steel platform and a support column for supporting the steel platform, and the sorting grid mouths are arranged on the steel platform. The number of sorting grid mouths on the steel platform of FIG. 8 is the same as the number of sorting grid mouths on the steel platform of FIG. 9, i.e., 36 sorting grid mouths. In FIG. 9, the 36 sorting grid mouths are distributed on the steel platform in a manner of 6×6.

In FIG. 8, the 36 sorting grid mouths are divided into 9 groups of sorting grid mouths. Each group includes 4 sorting grid mouths, and 4 chutes and 4 item containers are disposed under each group. The sorting grid mouths, chutes and item containers in each group of sorting grid mouths can be disposed using the arrangement of the embodiment 1 or the embodiment 2. In the arrangement of the embodiment 1 or the embodiment 2, the sorting grid mouths are divided into multiple groups of sorting grid mouths, and positions of the chutes and the item containers under the sorting grid mouths are concentrated. The arrangement of 4 chutes in a group of sorting grid mouths forms a rotating cycle in the space, so that 4 planes in which the 4 chutes are located may form a cylinder with a square as a bottom surface, and the 4 sorting grid mouths are disposed at four corners of the square.

The cylinder of each group of sorting grid mouths is independent and no interference exists between adjacent groups, so the space between the adjacent groups can be used as the carrying operation passage for the carrying robot or person under the steel platform.

In FIG. 8 and FIG. 9, the area of the carrying passages is indicated by dotted lines. In comparison, the present embodiment in FIG. 8 has 3 lateral passages and 2.5 longitudinal passages, while in FIG. 9, since the chutes and the item containers disposed in a conventional layout occupy a lot of spaces, only 3 lateral passages exist, and the height of the passage is limited by the height of the chute.

Embodiment 4—a Parcel Sorting Platform

Figure 10:
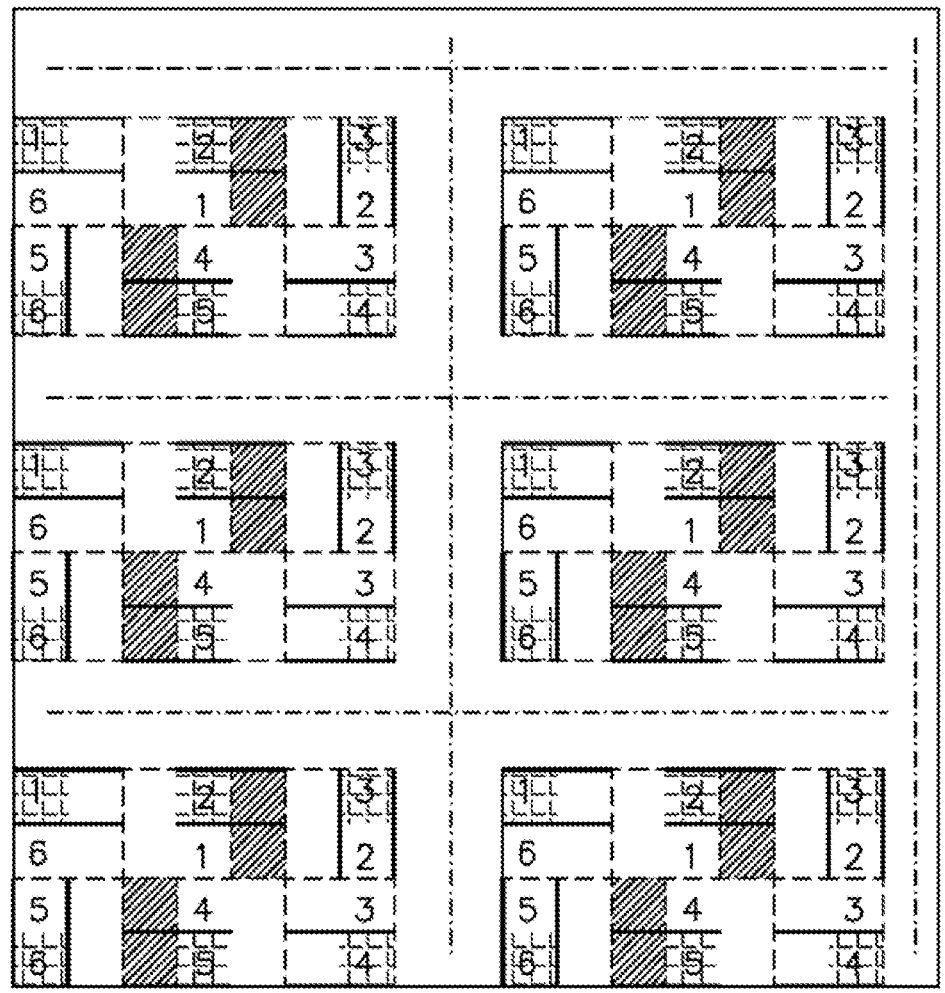
FIG. 10 is a schematic diagram of a parcel sorting platform according to another embodiment of the present disclosure.

FIG. 10 is a structural diagram of another parcel sorting platform according to an embodiment of the present disclosure. FIG. 10 is a top views. Compared with the parcel sorting platform illustrated in the embodiment 3, the total number of sorting grid mouths in the present embodiment is also 36. The difference between the present embodiment and the embodiment 3 mainly is that 36 sorting grid mouths in the present embodiment are divided into 6 groups of sorting grid mouths and each group includes 6 sorting grid mouths. The 6 sorting grid mouths define a rectangular outline, in which 4 sorting grid mouths are disposed at 4 corners of the rectangle. At the same time, the arrangement of 6 chutes and 6 item containers under each group of sorting grid mouths is adjusted.

With reference to FIG. 10, the parts filled with "L" indicate the sorting grid mouths, the thick solid lines indicate the chutes, and the dashed lines indicate the item containers. The item container is square and no item container is disposed in rectangular areas filled with oblique lines. The chute under the sorting grid mouth 1 is connected to the item container under the sorting grid mouth 2, the chute under the sorting grid mouth 2 is connected to the item container under the sorting grid mouth 3, the chute under the sorting grid mouth 3 is connected to the item container under the sorting grid mouth 4, the chute under the sorting grid mouth 4 is connected to the item container under the sorting grid mouth 5, the chute under the sorting grid mouth 5 is connected to the item container under the sorting grid mouth 6, and the chute under the sorting grid mouth 6 is connected to the item container under the sorting grid mouth 1.

The chute under the sorting grid mouth 1 and the chute under the sorting grid mouth 2 extend in the same direction, and the chute under the sorting grid mouth 4 and the chute under the sorting grid mouth 5 extend in the same direction. In 4 planes in which the chute under the sorting grid mouth 1, the chute under the sorting grid mouth 3, the chute under the sorting grid mouth 4 and the chute under the sorting grid mouth 6 are located respectively, two adjacent planes are perpendicular to each other. That is, the 4 planes in which the 4 chutes (the chute under the sorting grid mouth 1, the chute under the sorting grid mouth 3, the chute under the sorting grid mouth 4 and the chute under the sorting grid mouth 6) are located form a cylinder with a rectangle as the bottom surface in the space, the sorting grid mouths 1, 3, 4 and 6 are disposed at the four corners of the rectangle, and the sorting grid mouths 2 and 5 are respectively disposed in the middle of two long sides of the rectangle.

The cylinder of each sorting grid mouth group is independent, and no interference exists between adjacent groups, so the space between the adjacent groups can be used as carrying operation passage for the carrying robot or person under the steel platform.

From perspective of the rotating cycle of the 6 chutes, in the embodiment of FIG. 10, the direction of the rotating cycle of the 6 chutes under the sorting grid mouths 1~6 is clockwise, and the 6 sorting grid mouths are adjacent clockwise. In other embodiments, the 6 chutes may also be arranged to be rotating cycle in a counterclockwise direction, and the 6 sorting grid mouths are adjacent counterclockwise.

In FIG. 10, the areas of the carrying passages are indicated by dotted lines in which there are 3 lateral passages and 1.5 longitudinal passages. Compared with the embodiment 3 in FIG. 9, one longitudinal passage is reduced, but compared with the conventional layout in FIG. 10 with only 3 lateral passages whose height is limited, the layout in the present embodiment is superior to the conventional layout.

In a case of the same space, the same number of sorting grid mouths and the same arrangement, in one aspect, the arrangement of the chutes and the item containers of the present embodiment makes better use of the three-dimensional space and makes the whole structure more compact; there is no interaction between the carrying passages and the goods collection area, and the layout is more rational.

In another aspect, in the same space, on the basis of the conventional layout, the embodiments 3 and 4 of the present disclosure increase the area of the passages, and the number of passages also increases from 3 lateral passages, whose height is limited, to 3 lateral passages and 1.5~2.5 longitudinal passages, thereby greatly increasing the flexibility of the carrying robot or the person for carrying and greatly improving the carrying efficiency.

In another aspect, the size of all the chutes follows the uniform standard, thereby reducing the waste of costs exist in the design, manufacture and construction.

In the last aspect, the increased number of the passages in the embodiments of the present disclosure enable the support column for supporting the steel platform not to be a limitation for blocking the carrying path. The support column may be disposed in other positions, except for crossroads, within the passages, so that the carrying robot or person can easily carry the item container to the corresponding area by detouring to an adjacent path, thereby avoiding the waste of costs caused by the reduction of sorting grid mouths or the increase of the column span.

Embodiment 5—a Parcel Sorting System

A parcel sorting system includes an intelligent robot and the parcel sorting platform described in the embodiment 3. The intelligent robot can carry a parcel, move on the parcel sorting platform according to a planned path, transport the parcel to a calculated target sorting grid mouth and unload the parcel into the target sorting grid mouth.

Embodiment 6—a Parcel Sorting System

A parcel sorting system includes an intelligent robot and the parcel sorting platform described in the embodiment 4. The intelligent robot can carry a parcel, move on the parcel sorting platform according to a planned path, transport the parcel to a calculated target sorting grid mouth and unload the parcel into the target sorting grid mouth.

The embodiment of the present disclosure forms a new docking layout form of sorting grid mouth-chute-item container based on a grouping concept, which is a three-dimensional layout with characters of the same distance in an upper portion and concentration in a lower portion. So the projection space occupied by the chutes and the item containers under the steel platform can be reduced, new carrying passages are created in the place, thereby making the carrying paths more flexible and greatly improving the carrying efficiency. After applying the present disclosure, on the basis of no waste of cost, the space occupied by the item containers and the chutes in the place is reduced, the passages for transporting the item containers and the space for operators to walk are increased. Therefore, the disclosure can meet the size requirement of the chutes and the item containers, and enables the number of sorting grid mouths and item containers to be not reduced. In addition, the disclosure can also save the overall space under the steel platform and leave more space for the item containers carrying and walking paths of the personnel. In the present disclosure, the utilization rate of overall space is improved, the carrying efficiency of the item containers is improved, and the overall operation efficiency of the sorting system is finally improved.

It should be understood that the term "one" should be regarded as "at least one" or "one or more". That is, the number of an element may be one in an embodiment and the number of the element may be more than one in another embodiment. The term "one" should not be considered to limit the number.

Although an ordinal number such as "first" and "second", etc., is used to describe various components, the ordinal number is not intended to limit these components herein. The term is only used to distinguish one component from another component. For example, a first component may be referred to as a second component, and similarly, a second component may also be referred to as a first component, without departing from the concept of the present disclosure. The term "and/or" used herein includes any or all combinations of one or more listed associated items.

Terms used herein are only used to describe various embodiments and are not intended to limit the present disclosure. As used herein, a singular form is intended to include a plural from, unless clearly indicated in the context. In addition, it will be understood that the terms "including" and/or "having" used in the specification are intended to mean the existence of the described features, numbers, steps, operations, components, elements or combinations thereof, without excluding the existence or addition of one or more other features, numbers, steps, operations, components, elements, or combinations thereof.

What is claimed is:

1. An automatic transfer system for items, comprising:
    an item container, which is configured to receive to-be-conveyed items with a preset destination;
    a detection device, which is configured to detect whether items in the item container meet a transfer condition;
    a carrying device, which is configured to automatically transfer the item container to a preset location when the items falling into the item container meet the transfer condition; and
    a sorting grid mouth, which is configured to be bound to the destination of the items;
    wherein the detection device comprises at least one of the following:
        a distance sensor, which is configured to detect depth information of the items falling into the item container, wherein the depth information is configured to determine whether the items falling into the item container meet the transfer condition;
        a counter, which is configured to calculate a number of the items falling into the item container, wherein the number of the items is configured to determine whether the items falling into the item container meet the transfer condition; or
        an image pickup device, which is configured to acquire an image of a remaining capacity of the item container containing the items falling into the item container, wherein the image of the remaining capacity of the item container is configured to determine whether the items falling into the item container meet the transfer condition;
        wherein, when the item container corresponding to the sorting grid mouth is removed, the sorting grid mouth is turned into a self-locking state.

2. The system according to claim 1, wherein the sorting grid mouth is configured to assign the items to different item containers according to destinations of the items.

3. The system according to claim 1, further comprising:
    a scheduling server, which is configured to be in communication connection with the detection device and the carrying device respectively; and
    wherein the detection device is configured to send a transfer indication to the scheduling server when the items in the item container meet the transfer condition, and the scheduling server is configured to control the carrying device to transfer the item container to the preset location according to the indication.

4. The system according to claim 1, wherein
the carrying device is further configured to carry an empty item container from a second preset area to a preset sorting grid mouth.

5. The system of claim 1, further comprising a sorting platform, wherein the sorting platform comprises a sorting unit; and
    the sorting unit comprises: a plurality of sorting grid mouths disposed on a platform body of the sorting platform, a plurality of chutes located under the platform body, and a plurality of item containers located under the platform body, each of the plurality of item containers is disposed under a respective one of the plurality of sorting grid mouths;
    wherein each of the sorting grid mouths is docked with an inlet of a respective one of the plurality of chutes, and each chute is inclined;
    the plurality of sorting grid mouths are arranged in a clockwise cycle or a counterclockwise cycle, the plurality of chutes are arranged in a clockwise or a counterclockwise cycle, and the plurality of item containers are arranged in a clockwise cycle, or a counterclockwise cycle;
    each chute is configured to interface a respective sorting grid mouth at the inlet of the respective chute with an item container under an adjacent sorting grid mouth adjacent to the respective sorting grid mouth, wherein the adjacent sorting grid mouth, and the respective sorting grid mouth which is docked with the inlet of the respective chute, are adjacent clockwise or adjacent counterclockwise.

6. The system of claim 5, wherein each of the sorting grid mouths is a square sorting grid mouth.

7. The system of claim 5, wherein each of the plurality of item containers is disposed on a carrier.

8. The system according to claim 5, wherein the number of sorting grid mouths is equal to 2 times k, and the 2 times k sorting grid mouths are distributed in a manner of 2 rows and k columns or k rows and 2 columns, wherein k is an integer greater than or equal to 2.

9. The system according to claim 8, wherein the sorting unit comprises 6 sorting grid mouths, and the 6 sorting grid mouths are distributed in a manner of 2 rows and 3 columns.

10. The system according to claim 8, wherein the sorting unit comprises 4 sorting grid mouths, and the 4 sorting grid mouths are distributed in a manner of 2 rows and 2 columns.

11. The system according to claim 10, wherein a first item container is disposed under a first sorting grid mouth of the 4 sorting grid mouths, a second item container is disposed under a second sorting grid mouth of the 4 sorting grid mouths, a third item container is disposed under a third sorting grid mouth of the 4 sorting grid mouths, a fourth item container is disposed under a fourth sorting grid mouth of the 4 sorting grid mouths, an inlet of a first chute is docked with the first sorting grid mouth, an outlet of the first chute is docked with the second item container, an inlet of a second chute is docked with the second sorting grid mouth, an outlet of the second chute is docked with the third item container, an inlet of a third chute is docked with the third sorting grid mouth, an outlet of the third chute is docked with the fourth item container, an inlet of a fourth chute is docked with the fourth sorting grid mouth, and an outlet of the fourth chute is docked with the first item container.

12. The system of claim 5, wherein the sorting platform comprises the platform body, a support column for supporting the platform body, and a plurality of sorting units for implementing the sorting.

13. The system according to claim 12, wherein the plurality of sorting units is distributed on the sorting platform in an array form, and the sorting platform is set up in a sorting place.

14. The system of claim 12, further comprising:
a first robot configured to move on the platform body and put items to be sorted into any sorting grid mouth on the platform body.

15. The system according to claim 14, wherein the carrying device is a second robot, and the second robot is capable of carrying the item container.

16. An automatic transfer method for items, comprising:
receiving to-be-conveyed items with a preset destination by using an item container;
detecting whether the items falling into the item container meet a transfer condition by using a detection device; and
automatically transferring the item container to a preset location by using a carrying device when the items falling into the item container meet the transfer condition;
wherein the detecting whether the items falling into the item container meet a transfer condition by using a detection device comprises at least one of the following:
detecting depth information of the items falling into the item container, and determining whether the items falling into the item container meet the transfer condition according to the depth information;
calculating a number of the items falling into the item container, and determining whether the number of the items falling into the item container meet the transfer condition according to the number of the items;
acquiring an image of a remaining capacity of the item container containing the items falling into the item container through an image pickup device, and determining whether the items falling into the item container meet the transfer condition according to the image of the remaining capacity of the item container;
configuring a sorting grid mouth, and binding the sorting grid mouth to the destination of the items; and
when the item container corresponding to the sorting grid mouth is removed, turning the sorting grid mouth into a self-locking state.

17. The method according to claim 16, further comprising:
configuring a scheduling server to be in communication connection with the detection device and the carrying device respectively;
wherein the automatically transferring the item container to a preset location when the items falling into the item container meet the transfer condition comprises: operating the detection device to send a transfer indication to the scheduling server when the items in the item container meet the transfer condition; and operating the scheduling server to control the carrying device to transfer the item container to the preset location according to the indication.

18. The method according to claim 16, further comprising:
operating the carrying device to carry an empty item container from a second preset area to a preset sorting grid mouth.

* * * * *